March 15, 1932. H. KODANI 1,849,191
VEGETABLE AND FRUIT DISPLAY TABLE
Filed March 9, 1931
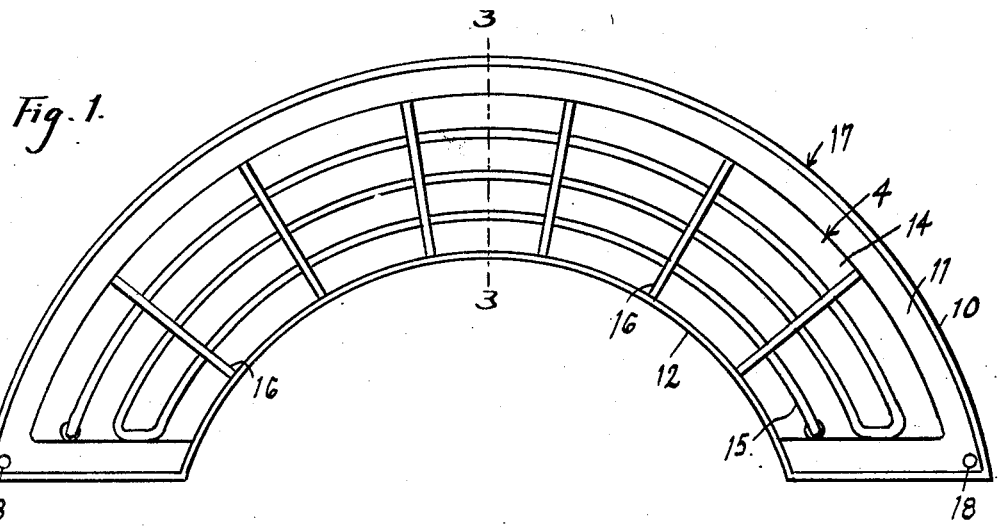
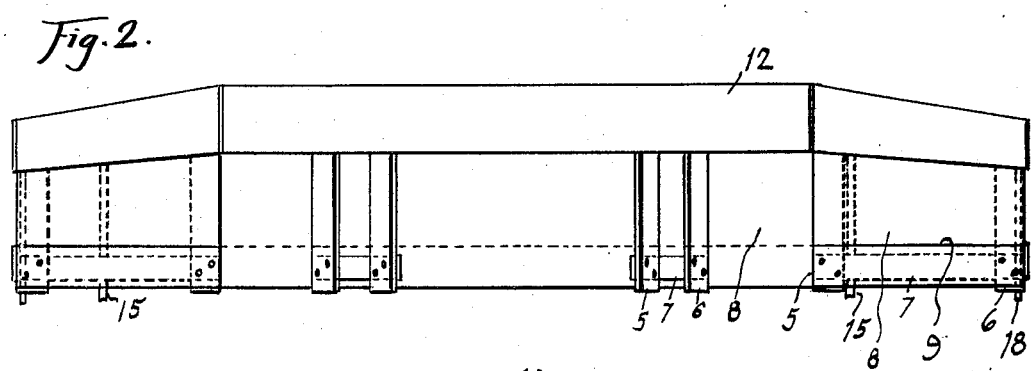
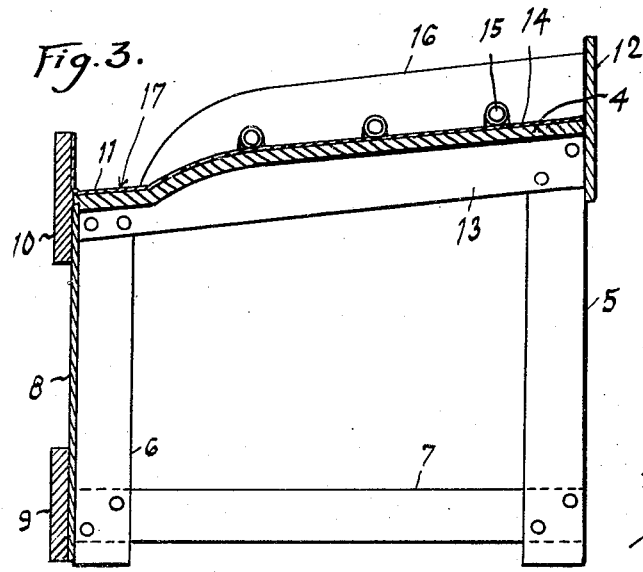
INVENTOR:
HANGO KODANI.
BY ATTY:
Edward M. Kojima Patented Mar. 15, 1932

1,849,191

UNITED STATES PATENT OFFICE

HANGO KODANI, OF LOS ANGELES, CALIFORNIA

VEGETABLE AND FRUIT DISPLAY TABLE

Application filed March 9, 1931. Serial No. 521,206.

This invention relates to improvements in vegetable and fruit display tables, and its objects are to provide in combination with a supporting table, means for keeping cool any fruit and vegetables that may be disposed thereon, to provide means whereby vegetables or fruit may be readily drained after washing, and to provide a tray and inclined surface for the table whereby dirt, soil, and foreign matter may be kept from dropping on the floor around the table.

In carrying out the invention, I provide a circular or curved form of table, having an inclined upper surface which has a sheet metal covering, a plurality of cooling pipes disposed thereon, and partition members supporting and spacing the pipes, a tray extending around the lower edge of the table, and drain pipes leading from the tray, all serving to protect and cool the fruit and vegetables that may be disposed on the table, and to provide means whereby they may be cleaned and thereafter dried for a better display thereof.

In the drawings: Figure 1 is a top plan view of a table embodying the features of the invention. Fig. 2 is a rear elevation thereof. Fig. 3 is a section on line 3—3, of Fig. 1.

Referring in detail to the drawings, the table has an inclined top 4, formed as a segment of a circle, and supported by legs 5 and 6, which, at the bottom, are connected by braces 7. A front wall 8 extends from end to end of the table, and has a reinforcing member 9 co-extending therewith, at the bottom thereof, and has a flange 10 forming a tray extending around the lower top edge 11, and at the rear a flange 12. Cross-braces 13 support the table top 4, which is covered by a sheet-metal cover 14. A refrigerating pipe 15 is disposed on the table top, and is maintained in position and spaced apart by partition members 16. In connection with tray 17, formed by flange 10, I provide drain pipes 18, leading therefrom, and which may be connected to a sewer or any waste water container. The refrigerating pipe 15 may be connected to any refrigerating source (not shown).

In use, the vegetables and fruit may be piled or disposed on the table. To cleanse the same, any means, such as sprinklers, may be employed to throw water on the fruit or vegetables, and will flow to the tray and thence through the drain pipes. The partition members will separate the varieties of fruit or vegetables, and will further serve to deflect the cool moisture emanating from the pipe 15, upwardly. Pipe 15 also serves to maintain the fruit or vegetables in position, and prevents the same from sliding into the tray and off from the table top.

From the foregoing description and drawings, it may be seen that I have provided a table well adapted to support fruit or vegetables in a display position, to maintain them separately relative to one another, to keep the fruit or vegetables in cool condition, and to allow the same to be cleansed by sprinkling with water, and to prevent soil or dirt from dropping on the floor around the table.

What is claimed is:

1. In a display table, the combination with a segmental and inclined table top, of a drain tray extending around the outer and lower edge of the top, legs supporting the table top, and a front and end wall member coextending with the drain tray.

2. The combination with a segmental and inclined table top and a tray integral therewith and extending around the lower and outer edge thereof, and legs supporting the table top, of an upwardly-extending flange around the inner edge of the top, and a plurality of radially disposed partition members extending from the inner flange to the tray.

HANGO KODANI.